US008224008B2

(12) United States Patent
Klemenz et al.

(10) Patent No.: US 8,224,008 B2
(45) Date of Patent: Jul. 17, 2012

(54) HEARING APPARATUS WITH A MOVEABLE CHARGING CONTACT

(75) Inventors: Harald Klemenz, Singapore (SG); Tom Weidner, Erlangen (DE)

(73) Assignee: Siemens Medical Instruments Pte. Ltd., Singapore (SG)

( * ) Notice: Subject to any disclaimer, the term of this patent is extended or adjusted under 35 U.S.C. 154(b) by 1010 days.

(21) Appl. No.: 12/182,374

(22) Filed: Jul. 30, 2008

(65) Prior Publication Data

US 2009/0034749 A1 Feb. 5, 2009

(30) Foreign Application Priority Data

Jul. 30, 2007 (DE) ........................ 10 2007 035 713
Nov. 26, 2007 (EP) .................................... 07121499

(51) Int. Cl.
*H04R 25/00* (2006.01)
*H01M 2/10* (2006.01)

(52) U.S. Cl. .......... 381/323; 381/74; 381/314; 381/330; 381/381; 429/97; 429/98; 429/100

(58) Field of Classification Search .................... 381/74, 381/323, 330, 314, 381; 429/97, 98, 100
See application file for complete search history.

(56) References Cited

U.S. PATENT DOCUMENTS 4,799,048 A * 1/1989 Goshima et al. .............. 340/626
6,093,056 A 7/2000 Donauer et al.
6,143,440 A 11/2000 Volz et al.
6,310,960 B1 * 10/2001 Saaski et al. .................. 381/323
6,549,634 B1 4/2003 Vonlanthen
6,549,635 B1 * 4/2003 Gebert .......................... 381/324
6,658,124 B1 * 12/2003 Meadows ...................... 381/323
6,831,988 B2 * 12/2004 Vonlanthen ................... 381/323
7,620,195 B2 * 11/2009 Bengtsson et al. ............ 381/323
8,027,497 B2 * 9/2011 Klemenz et al. .............. 381/323
2002/0101220 A1 * 8/2002 Yang ............................ 320/150
2004/0120539 A1 6/2004 Panitzsch
2007/0104343 A1 * 5/2007 Bengtsson et al. ............ 381/323
2008/0118093 A1 * 5/2008 Klemenz et al. .............. 381/324
2008/0136369 A1 * 6/2008 Klemenz et al. .............. 320/107
2008/0240480 A1 * 10/2008 Pinnell et al. ................. 381/323
2009/0074219 A1 * 3/2009 Klemenz et al. .............. 381/324

FOREIGN PATENT DOCUMENTS

AU 761 764 B2 6/2003

(Continued)

*Primary Examiner* — Zandra Smith
*Assistant Examiner* — Jeremy Joy
(74) *Attorney, Agent, or Firm* — Laurence A. Greenberg; Werner H. Stemer; Ralph E. Locher

(57) ABSTRACT

A hearing apparatus includes a charging contact being movable relative to an accumulator and being electrically conductively connected to the accumulator in a first position and less effectively conductively connected thereto in a second position. A spring-elastic element engages with the charging contact in order to push the charging contact into the second position with a predetermined force, so that the charging contact can only be pushed into the first position by overcoming the predetermined force. As a result, the charging contact configuration obtains a switching function, so that electrocorrosion on the charging contacts can be prevented. Therefore, charging an accumulator of a hearing apparatus and in particular of a hearing device using a direct conductive contact is possible, with zero potential of the charging contacts which are accessible from the outside being ensured during normal operation of the hearing apparatus.

2 Claims, 5 Drawing Sheets

FOREIGN PATENT DOCUMENTS

| | | | |
|---|---|---|---|
| DE | 43 31 320 | A1 | 3/1995 |
| DE | 299 16 350 | U1 | 1/2000 |
| DE | 198 37 909 | C2 | 2/2000 |
| GB | 1 254 017 | | 11/1971 |
| GB | 2 324 405 | A | 10/1998 |

* cited by examiner

HEARING APPARATUS WITH A MOVEABLE CHARGING CONTACT

CROSS-REFERENCE TO RELATED APPLICATION

This application claims the priority, under 35 U.S.C. §119, of German Patent Application DE 10 2007 035 713.5, filed Jul. 30, 2007 and European Patent Application EP 07 12 1499, filed Nov. 26, 2007; the prior applications are herewith incorporated by reference in their entirety.

BACKGROUND OF THE INVENTION

Field of the Invention

The present invention relates to a hearing apparatus with a signal processing device for processing an input signal to form a sound output signal, an accumulator for supplying power to the signal processing device and a charging contact for feeding electrical energy into the accumulator. The term hearing apparatus is understood in this case to mean, in particular, a hearing device, but also any other wearable sound-emitting device such as a headset, earphones and the like.

Hearing devices are wearable hearing apparatuses, which are used to assist the hearing impaired. In order to accommodate numerous individual requirements, various types of hearing devices are available such as behind-the-ear (BTE) hearing devices, hearing device with an external receiver or receiver in the canal (RIC) and in-the-ear (ITE) hearing devices, for example concha hearing devices or completely-in-the-canal (ITE, CIC) hearing devices as well. The hearing devices listed as examples are worn on the outer ear or in the auditory canal. Bone conduction hearing aids, implantable or vibrotactile hearing aids are also available on the market. Damaged hearing is thus stimulated either mechanically or electrically.

The key components of hearing devices are principally an input converter, an amplifier and an output converter. The input converter is normally a receiving transducer e.g. a microphone and/or an electromagnetic receiver, e.g. an induction coil. The output converter is most frequently realized as an electroacoustic converter e.g. a miniature loudspeaker, or as an electromechanical converter e.g. a bone conduction hearing aid. The amplifier is usually integrated into a signal processing unit. That basic configuration is illustrated in FIG. 1 using the example of a behind-the-ear hearing device. One or a plurality of microphones 2 for recording ambient sound are built into a hearing device housing 1 to be worn behind the ear. A signal processing unit 3, which is also integrated into the hearing device housing 1, processes and amplifies the microphone signals. An output signal of the signal processing unit 3 is transmitted to a loudspeaker or receiver 4, which outputs an acoustic signal. Sound is transmitted through a sound tube, which is affixed in the auditory canal through the use of an otoplastic, to the device wearer's eardrum. Power for the hearing device and, in particular, for the signal processing unit 3, is supplied through the use of a battery 5 which is also integrated in the hearing device housing 1.

Hearing devices and other hearing apparatuses are in many cases equipped with accumulators (storage battery and/or rechargeable battery) in order to power their electronics system. The accumulators are mostly charged in such a way that the accumulators can remain in the hearing device during the charging process. Contacts which are accessible from the outside are thus provided on the housings of the hearing devices and/or hearing apparatuses. Electrical energy can be fed into the respective accumulator by a charging circuit, by way of the contacts. This means that provision can be made for a direct conductive contact between the charging circuit and the storage battery remaining in the device in order to charge the accumulators in the devices.

The conductive contact, also known as a charging contact, which is accessible from the outside, should have zero potential during normal operation of the device. However, the charging contacts attached to the housing exterior of the hearing devices are generally constantly energized. That presents a psychological problem on one hand and on the other hand additional corrosion could occur if they come into contact with perspiration, for instance, as a result of the electrical voltage at the contacts.

In order to avoid the problem of corrosion, charging circuits are also known which transmit the electrical energy to the hearing devices to be charged in a contactless manner using coils (inductive charging). Hearing devices are also known which do not have any charging contacts that are accessible from the outside. In those instances, the charging is effected through the use of a direct electrical contacting of the storage battery after a battery compartment is opened.

SUMMARY OF THE INVENTION

It is accordingly an object of the invention to provide a hearing apparatus with a moveable charging contact, which overcomes the hereinafore-mentioned disadvantages of the heretofore-known devices of this general type, which can be easily charged from the outside by way of charging contacts and with which the charging contacts substantially have zero potential during normal operation.

With the foregoing and other objects in view there is provided, in accordance with the invention, a hearing apparatus, comprising a signal processing unit for processing an input signal to form a sound output signal, an accumulator for supplying power to the signal processing unit, and a charging contact for feeding electrical energy into the accumulator. The charging contact is movable relative to the accumulator between a first position in which the charging contact is electrically conductively connected to the accumulator and a second position in which the charging contact is less effectively conductively connected or not connected to the accumulator. A spring-elastic element engages the charging contact for pushing the charging contact into the second position with a predetermined force and permitting the charging contact to be pushed into the first position only by overcoming the predetermined force.

On one hand, the moveable charging contact advantageously provides for an electrical contact when charging and on the other hand, zero potential during normal operation. This mechanical structure does not require complicated electrical circuitry, thereby ensuring zero potential during normal operation.

In accordance with another feature of the invention, the spring-elastic element may have a rubber sleeve, which surrounds the charging contact. A rubber sleeve of this type not only ensures the reset force of the charging contact but also its insulation at the periphery.

In accordance with a further feature of the invention, the spring-elastic element may also have a metallic spring or a plastic spring, which is fastened to a housing of the hearing apparatus. If the plastic spring is injection-molded onto the housing in one piece, the number of components of the hearing apparatus can thus be reduced.

In accordance with an added feature of the invention, the spring-elastic element can also include a self-resetting, compressible film, which has a lower electrical resistance in the compressed state than in the uncompressed state. A film of this type provides for electrical contacting during the charging operation and for zero potential during normal operation, with the most minimal installation space requirement.

In accordance with an additional feature of the invention, in the first position, the charging contact preferably contacts the accumulator by way of a battery spring. This allows the operating sphere of the charging contact to increase as compared with the instance in which the charging contact directly contacts the accumulator.

In accordance with yet another feature of the invention, the charging contact can also have a contact surface which, in the first position, is in contact with a second contact surface of an accumulator contact, which for its part is connected to the accumulator. The accumulator contact, which can be realized, in particular, as a spring contact, allows an indentation depth of the charging contact to be varied significantly and the distance of the charging contact from the accumulator in the second position not to be predetermined.

In accordance with yet a further feature of the invention, by way of example, the charging contact forms a U-shaped contact configuration with the accumulator contact. The contact configuration has legs respectively formed by the charging contact and the accumulator contact and the two legs are connected to an insulator. The indentation depth and the tolerance, as to the extent to which the legs can be pushed past the contacting, can vary slightly depending on the distance between the contact surfaces and the insulator.

In accordance with a concomitant feature of the invention, it is advantageous if the insulator of the U-shaped contact configuration simultaneously forms the spring-elastic element. This multiple functionality can dispense with the need for an additional element.

Other features which are considered as characteristic for the invention are set forth in the appended claims.

Although the invention is illustrated and described herein as embodied in a hearing apparatus with a moveable charging contact, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 1:
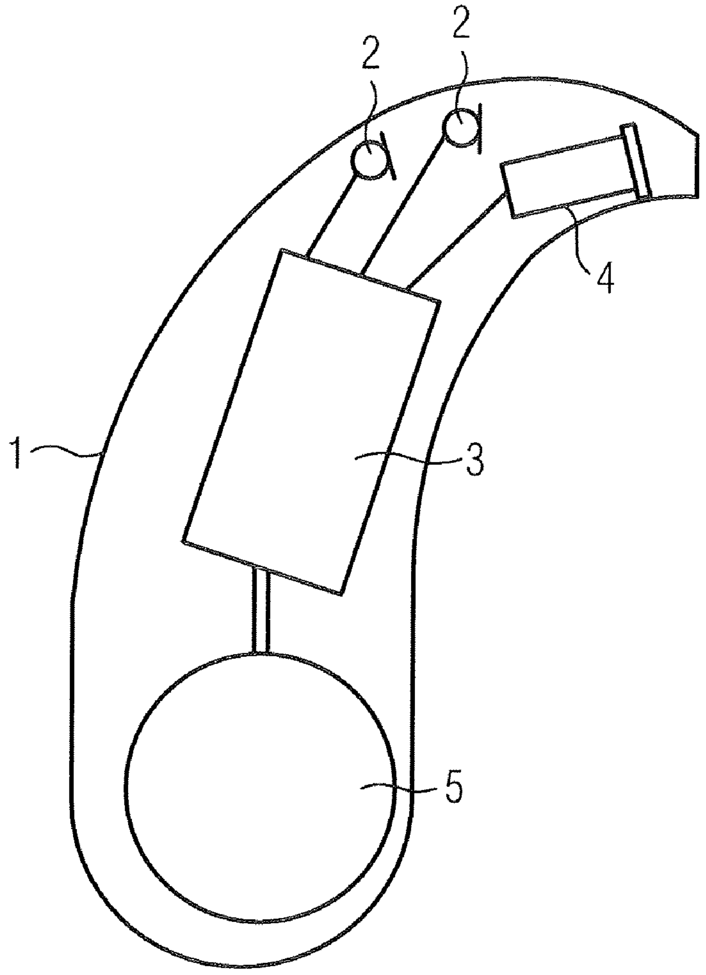
FIG. 1 (Prior art)
FIG. 1 is a diagrammatic, side-elevational view of an interior of a housing of a behind-the-ear hearing device including a basic circuit diagram of a construction of a hearing device according to the prior art.
Figure 2:
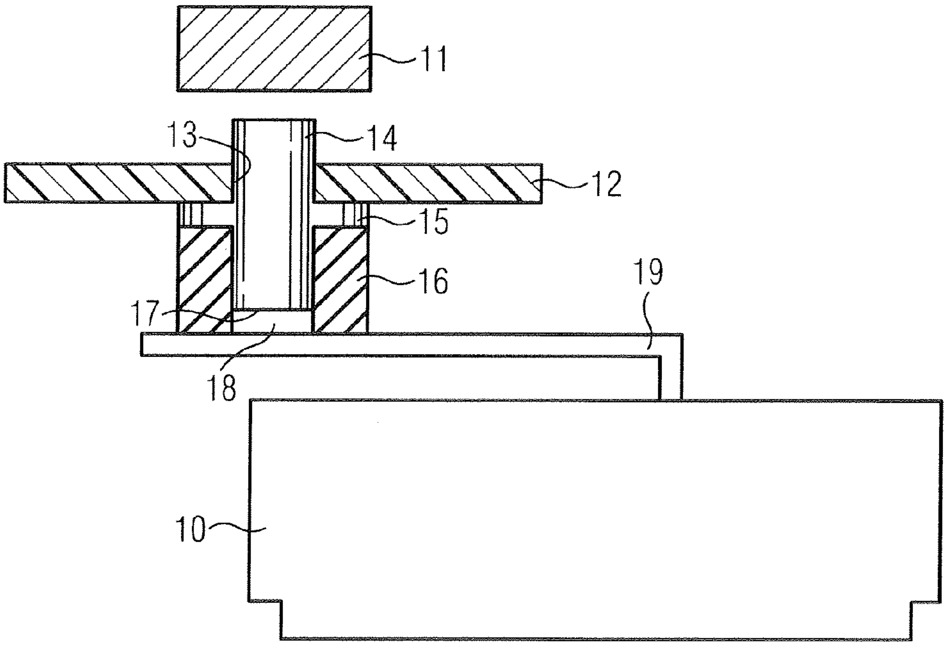
FIG. 2 is a cross-sectional view of a charging contact with a rubber sleeve in a stand-by mode and/or during normal operation.

Referring now in detail to the figures of the drawings, which illustrate exemplary embodiments in more detail representing preferred embodiments of the present invention and first, particularly, to FIG. 2 thereof, there is seen an accumulator 10 which is to be charged by way of a charging device contact 11 of a charging device. FIG. 2 also shows a hearing device housing 12, in which the accumulator 10 to be charged is disposed. For the sake of clarity, the representation of additional components of the hearing device within the hearing device housing is omitted.

A bore 13 is located in the hearing device housing 12 and a charging contact 14 is moveably mounted in the bore 13 at right angles to the hearing device housing 12. In the present example, the charging contact 14 is configured in the manner of a cylinder and has a circumferential shoulder 15. The charging contact 14 is also surrounded by a rubber sleeve 16, which is insulating on one hand and has spring-elastic properties on the other hand. The extension of the rubber sleeve 16 in the longitudinal direction and/or direction of motion of the charging contact 14 is somewhat greater than the extension of the charging contact 14 from the shoulder 15 to a front face 17 of the contact 14. As a result, a gap 18 is produced between the front face 17 of the contact 14 and a battery spring 19, which produces an electrical contact between the charging contact 14 and the accumulator 10 during a charging process. In the state illustrated in FIG. 2, the charging contact 14 is thus moved away from the battery spring 19 through the rubber sleeve 16 and strikes the hearing device housing 12 with its shoulder 15. The shoulder 15 thus not only provides for a contact surface of the rubber sleeve 16, but is also used as a stopper of the charging contact 14 on the hearing device housing 12 when the charging contact 14 moves away from the battery spring 19.

Figure 3:
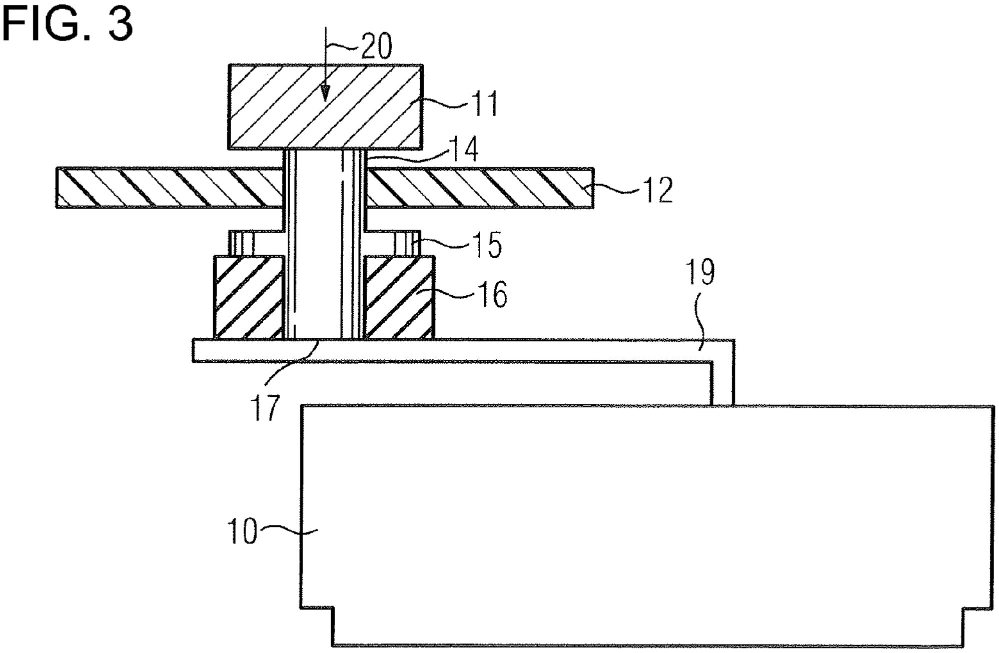
FIG. 3 is a cross-sectional view of the charging contact in FIG. 2 during a charging process.

While a normal operating state and/or stand-by mode of the charging contact 14 is shown in FIG. 2, FIG. 3 shows a charging state. The charging device contact 11 is pushed onto the charging contact 14 in accordance with an arrow 20, as a result of which the charging contact 14 is in turn pushed onto the battery spring 19 against the spring force of the rubber sleeve 16, with direct electrical contact with the battery spring 19 being established on the front side of the charging contact 17. The rubber sleeve 16 is compressed between the shoulder 15 of the charging contact 14 and the battery spring 19 to such a degree that an air gap no longer exists between the charging contact 14 and the battery spring 19. A charging current thus flows from the charging device contact 11 through the charging contact 14 into the hearing device and through the battery spring 19 to the accumulator 10.

At least one of the charging contacts which is accessible from the outside thus has no contact with the storage battery in the normal operating state of the preferred exemplary embodiment described in more detail on the basis of FIGS. 2 and 3. It is in fact separated from the storage battery 10 by way of a structural distance. The contact between the charging circuit and the storage battery 10 is first established by way of the charging contact 14, if the charging device links the charging contact electrically with the accumulator 10 and/or the battery spring 19 through the use of a mechanical movement.

Figure 4:
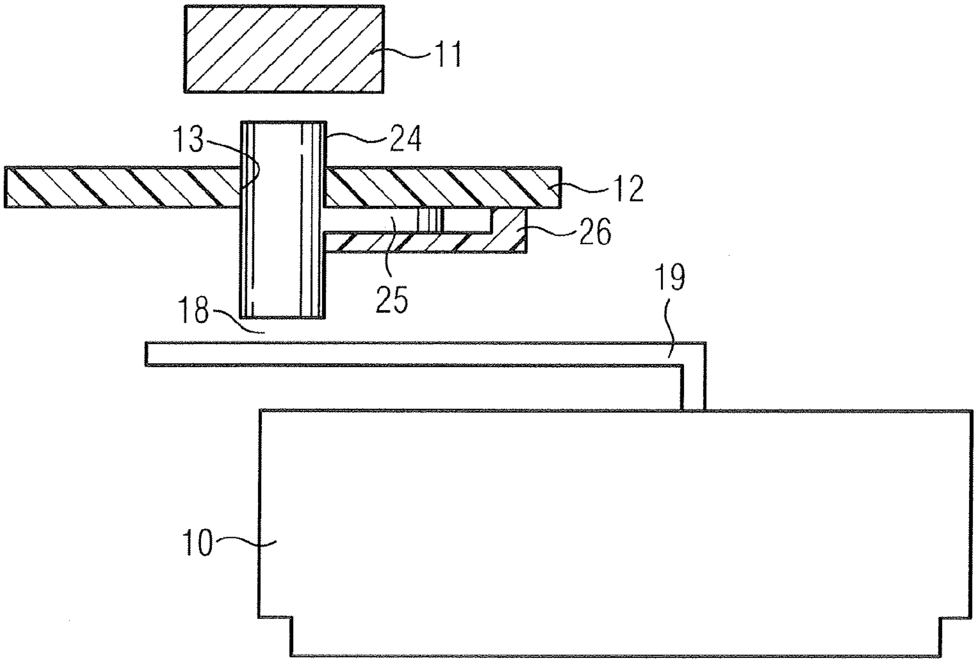
FIG. 4 is a cross-sectional view of a charging contact with a plastic spring in a stand-by mode.
Figure 5:
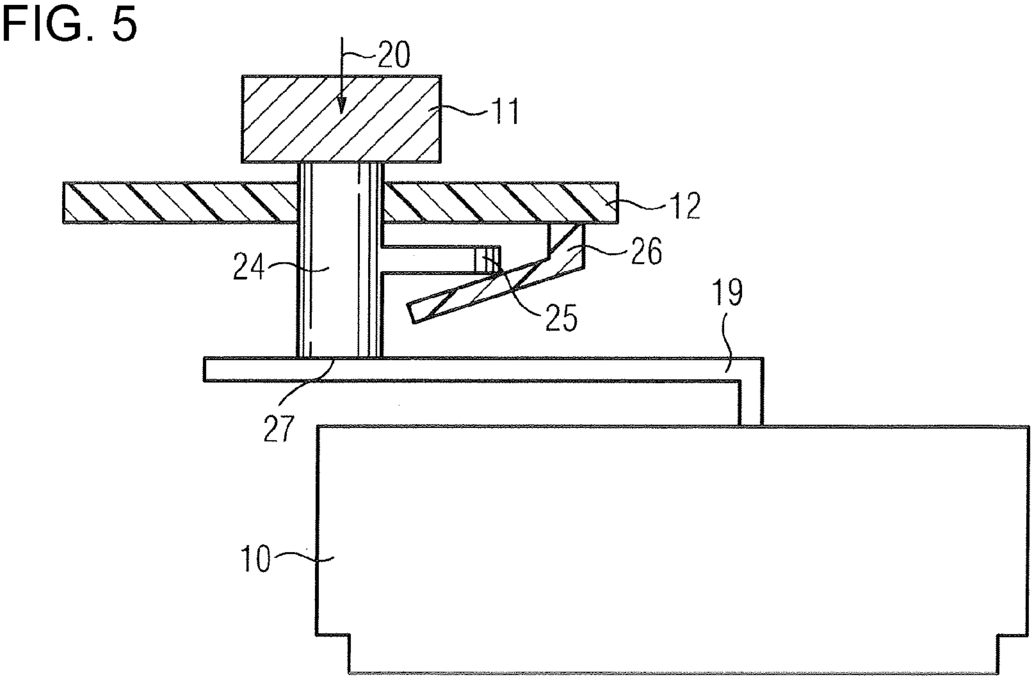
FIG. 5 is a cross-sectional view of the charging contact in FIG. 4 during a charging process.

An additional exemplary embodiment of the invention is shown diagrammatically in FIGS. 4 and 5. The components, including the accumulator 10, the charging device contact 11, the hearing device housing 12, the bore 13 and the battery spring 19 are likewise embodied in this case like they are in the preceding exemplary embodiment. A charging contact 24 is likewise embodied cylindrically in its basic form in this case. Naturally, it can similarly be square or have another suitable three-dimensional construction. It also has a projection 25, which is disposed on one side in this case, but may similarly have an annular shape like the shoulder 15 of the preceding example. A metallic or plastic spring 26 is attached to the hearing device housing 12. If applicable, it is directly injection-molded onto the plastic housing 12 or screwed thereto. The plastic spring 26 holds the charging contact 24 against the protrusion 25, so that an air gap 18 is in turn produced between the charging contact 24 and the battery spring 19 in the stand-by mode shown in FIG. 4. In this stand-by mode, the protrusion 25 strikes the interior of the hearing device housing 12, so that a movement of the charging contact 24 in the direction out of the hearing device housing 12 is restricted.

If, in accordance with FIG. 5, the charging device contact 11 is pushed onto the charging contact 24 as in the example shown in FIG. 3, the charging contact 24 moves downwards against the spring force of the plastic spring 26 and contacts the battery spring 19 directly. If the charging device contact 11 is removed again from the charging contact 24 opposite to the direction of motion 20, the latter moves upwards, driven by the spring force of the plastic spring 26, and/or somewhat out of the hearing device housing 12. As a result, the air gap 18 between the charging contact 24 and the battery spring 19 adjusts again to the front face 27 of the charging contact. The electrical contact is thus interrupted again.

Figure 6:
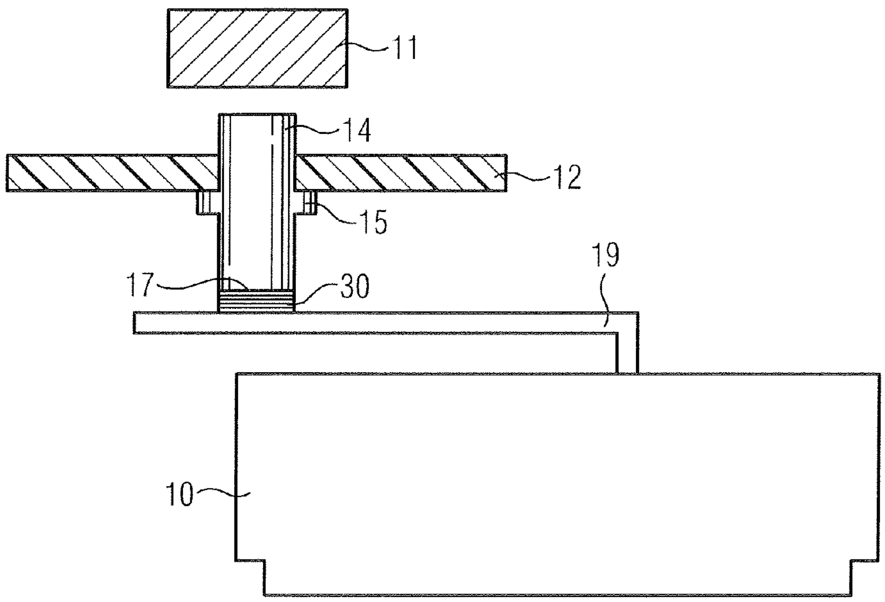
FIG. 6 is a cross-sectional view of a charging contact with a compressible film in a stand-by mode.
Figure 7:
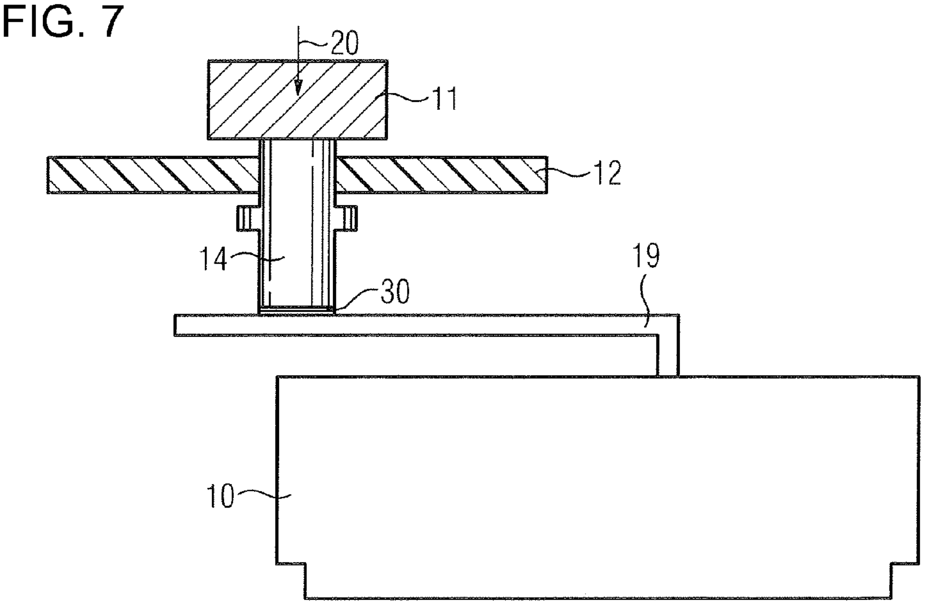
FIG. 7 is a cross-sectional view of the charging contact in FIG. 6 during a charging process.

A third exemplary embodiment of a hearing apparatus with a charging contact configuration according to the invention is shown in FIGS. 6 and 7. The components including the charging device contact 11, the hearing device housing 12, the charging contact 14, the shoulder 15, the charging contact front side 17, the battery spring 19 and the accumulator 10, also correspond in this case to the correspondingly identically numbered components of the first exemplary embodiment according to FIG. 2 and FIG. 3. A compressible foil 30 is located in this case between the front face 17 of the charging contact and the battery spring 19. In the state illustrated in FIG. 6, the film 30 is uncompressed and is thus insulating. It also has spring-elastic properties and pushes the charging contact 14 with its shoulder 15 against the hearing device housing 12.

The charging device contact 11 is also pushed downwards for the charging process, i.e. onto the battery spring 19, according to the direction of motion 20. The foil 30 is therewith compressed according to FIG. 7. The foil 30 is electrically conductive in this compressed state. In other words, the compressible foil 30, which is located between the charging contact 14 and the inner contact and/or the battery spring 19, and which is highly-resistive and/or insulating in the stand-by mode according to FIG. 6, becomes low-resistive and conductive as a result of the pressure exerted thereupon. In this case the charging contact 14 is generally only moved and/or displaced marginally. In any case, the mechanical deformation of the foil 30 during compression is sufficient to change the electrical properties of the foil 30 with respect to its electrical resistance in such a way that a charging current can flow from the charging device to the accumulator 10.

Figure 8:
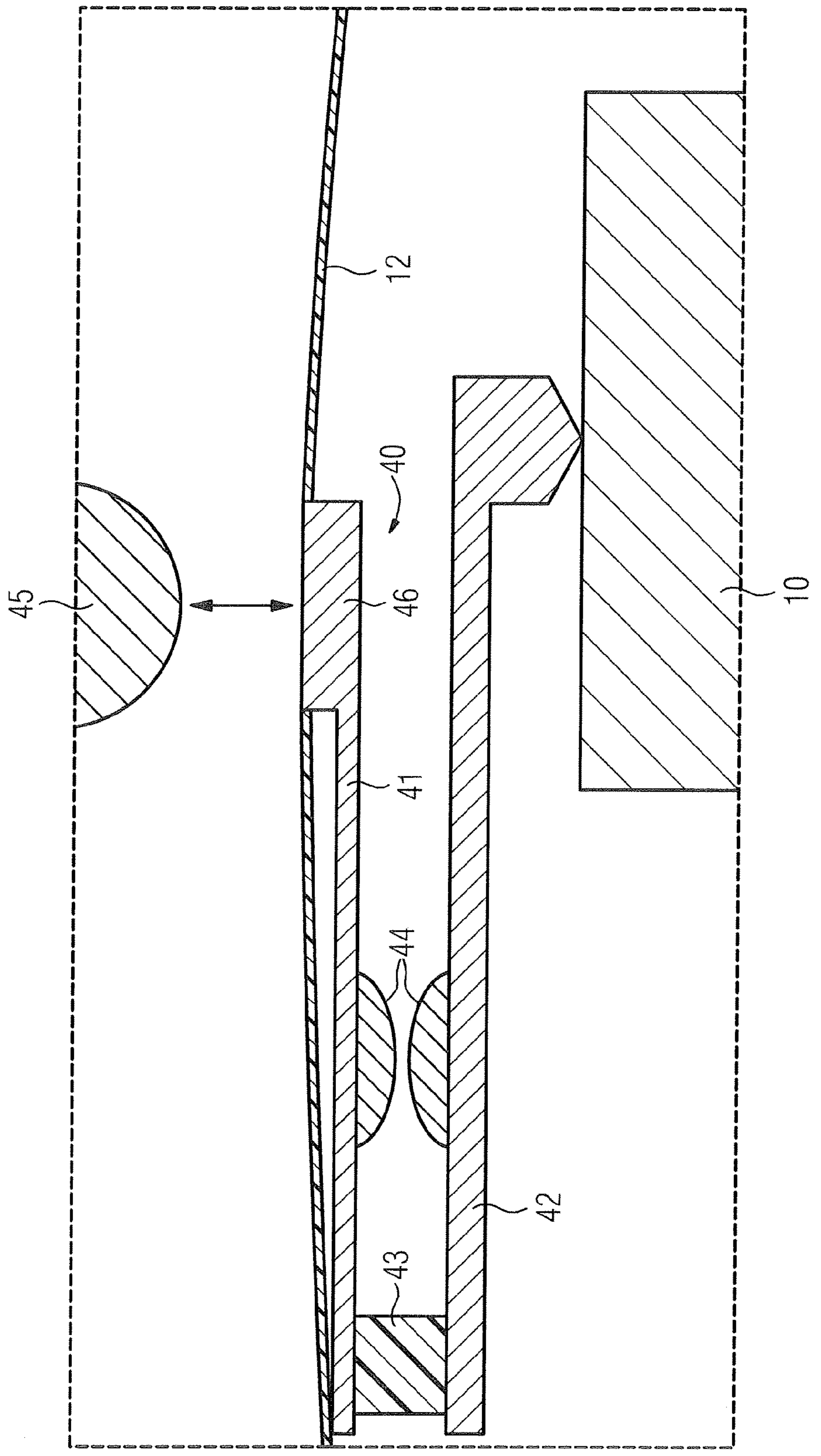
FIG. 8 is a cross-sectional view of a further embodiment of a charging contact.

FIG. 8 shows a cross-section of a fourth exemplary embodiment of a hearing apparatus with a charging contact configuration according to the invention. A charging contact 40 is integrated flush with a hearing device shell 12 with its surface directed outwards. The charging contact 40 has an oblong contact section 41 in the interior of the hearing device shell 12. A battery spring 42, which is disposed parallel thereto, is continuously connected to the battery and/or accumulator 10. It is likewise embodied in this case to be oblong, with one of its ends being connected to an end of the oblong contact section 41 of the charging contact 40 by way of an insulator 43. A U-shaped construction of the components, including the charging contact 40, the insulator 43 and the battery spring 42 thus results in the cross-section. The insulator 43 has spring-elastic properties and holds the two legs of the U-shaped configuration, namely the charging contact 40 and the battery spring 42, in the position shown in FIG. 8 (second position), in which the two components do not touch and are thus not electrically connected.

The charging contact 40 has a contact bump and/or a contact surface 44 made of conductive metal on the side which the battery spring 42 faces. The battery spring 42 likewise has a contact bump and/or contact surface 44 on its side facing the charging contact 40. As soon as the two contact surfaces 44 touch, the charging contact 40 is electrically connected to the battery spring 42. This is then the case if a contact 45 of a charging station pushes a charging section 46 of the charging contact 40, which is accessible from the outside, downwards and/or inwards. In the depressed state, the two contact surfaces 44 are then shorted and a charging current can flow from the contact 45 of the charging station through the charging contact 40, the contact surfaces 44 and the battery spring 42 into the accumulator 10. At the end of the charging process, i.e. when removing the contact 45 from the charging station, the spring-elastic insulator 43 provides for the charging contact 40 to be DC-isolated or galvanically separated again from the battery spring 42.

Alternatively to the spring-elastic insulator 42, provision can also be made, for instance, for a spring-elastic element, e.g. a plastic spring to be disposed in the vicinity of the charging section 46 between the charging contact 40 and the battery spring 42, in order to ensure the necessary reset force. In this instance, the insulator 43 only has a joining function.

As a further alternative, the charging contact 40 and the battery spring 42 can also be directly injection-molded into the housing shell 12, if the charging contact 40 itself is spring-elastic. In this case, the hearing device shell 12 adopts the insulator function. In this exemplary embodiment, the spring-elastic element is thus directly integrated into the charging contact and/or is formed in one piece therewith. By way of example, the oblong contact section 41 thus then forms the spring-elastic element.

The spring force, against which the charging section 46 has to be pushed downwards in order to establish an electrical connection to the battery spring 42, can be adjusted slightly in the desired fashion with this U-shaped configuration. It is thus possible to select not only the modulus of elasticity of the insulator 43 and of the oblong contact section 41, but also the length of the contact section 41 accordingly.

An indentation depth of the charging section 46 can also be very effectively varied with this construction. A minimum indentation depth is defined in this case in that the two contact surfaces 44 touch. Furthermore, the charging section 46 can also be pushed deeper, i.e. the charging contact 40 can be over-pushed, since the contact surfaces 44 are not located directly below the charging section 46, but instead at a position of the oblong section 41 between the charging section 46 and the insulator 43, e.g. in the center region thereof. One part of the oblong section 41 is thus located between the contact surfaces 44 and the charging section 46, which can also be pushed downwards following a previously effected contacting process. As a result, the indentation depth, which results from the contact 45 of the charging station, can be kept in a large tolerance range, with it consequently being ensured that the electrical connection to the accumulator 10 is established reliably.

The embodiment of one or both charging contacts of the hearing apparatus according to the invention only allows the charging contacts which are accessible from the outside to be connected to the internal voltage source (accumulator 10) during the charging process. The charging contact configuration embodies a switching function in a certain way. The advantages of this charging contact configuration lie in it being possible for the charging device to remain simple and robust in terms of its construction. Furthermore, electro-corrosion is avoided due to the zero potential of one or both charging contacts and a current flow across the skin is ruled out in the case of a random simultaneous main contact of the two charging contacts. A simple measurement and monitoring of the accumulator is still also possible during operation, through the use of charging contacts which are accessible from the outside, if the switching function is triggered with the measurement device.

The invention claimed is:

1. A hearing apparatus, comprising:

a signal processing unit for processing an input signal to form a sound output signal;

an accumulator for supplying power to said signal processing unit;

a charging contact for feeding electrical energy into said accumulator, said charging contact being movable relative to said accumulator between a first position having said charging contact electrically conductively connected to said accumulator and a second position having said charging contact less effectively conductively connected or not connected to said accumulator; and a spring-elastic element having a rubber sleeve engaging and surrounding said charging contact for pushing said charging contact into said second position with a predetermined force and permitting said charging contact to be pushed into said first position only by overcoming said predetermined force.

2. The hearing apparatus according to claim 1, which further comprises a battery spring through which said charging contact in said first position contacts said accumulator.

* * * * *